United States Patent [19]

Worrall

[11] 4,136,140
[45] Jan. 23, 1979

[54] MOLDABLE FOAMED POLYMER COMPOSITION AND A PROCESS THEREFOR

[75] Inventor: Roy Worrall, Newport, Wales

[73] Assignee: Monsanto Limited (Monsanto Chemicals Ltd.), London, England

[21] Appl. No.: 520,068

[22] Filed: Nov. 1, 1974

Related U.S. Application Data

[62] Division of Ser. No. 360,882, May 16, 1973, abandoned.

[30] Foreign Application Priority Data

Jun. 8, 1972 [GB] United Kingdom ............... 26737/72

[51] Int. Cl.² ................................................. B29C 1/08
[52] U.S. Cl. ........................................ 264/42; 249/61; 264/317; 264/DIG. 44; 425/DIG. 12
[58] Field of Search ................... 264/317, 221, 42, 44, 264/59, DIG. 44; 249/61; 425/DIG. 12

[56] References Cited

U.S. PATENT DOCUMENTS

| 1,573,425 | 2/1926 | Steed | 264/317 X |
|---|---|---|---|
| 1,747,249 | 2/1930 | Korompay | 264/317 X |
| 3,247,294 | 4/1966 | Sabouni | 264/42 |
| 3,316,105 | 4/1967 | Feagin | 106/38.8 |
| 3,339,620 | 9/1967 | Krzyzanowski | 264/221 X |
| 3,634,562 | 1/1972 | Kole | 264/44 X |

FOREIGN PATENT DOCUMENTS

| 1942215 | 4/1970 | Fed. Rep. of Germany | 264/317 |
|---|---|---|---|
| 2002505 | 8/1971 | Fed. Rep. of Germany | 264/317 |
| 862152 | 3/1961 | United Kingdom | 264/DIG. 44 |

OTHER PUBLICATIONS

Metals Handbook, 8th Edition, vol. 5, Forging and Casting, pp. 239, 240 and 249, (1970).

Primary Examiner—Thomas P. Pavelko
Attorney, Agent, or Firm—Joseph S. Nelson; William J. Farrington; James C. Logomasini

[57] ABSTRACT

This invention relates to a moldable foamed polymer composition that can be molded at relatively low ambient temperatures and pressures. The moldable composition comprises a wax and particles of a foamed polymer, the wax being present in an amount capable of bonding the particles together in a coherent body. A method for forming articles from said composition along with processes for using said molded articles are also disclosed.

11 Claims, No Drawings

MOLDABLE FOAMED POLYMER COMPOSITION AND A PROCESS THEREFOR

This is a division, of application Ser. No. 360,882, filed May 16, 1973, now abandoned.

This invention relates to a moldable composition and particularly to a foamed polymer composition that can be molded at relatively low temperature and at ambient pressures.

one of the disadvantages of molding using a foamable polymer is that the molding operation usually requires heat and pressure to bring about the formation of the desired shape. Moreover, the loading of the mold and the physical conditions need to be rigorously controlled for maximum effectiveness. A composition has now been discovered in which the virtures of the foamed structure are largely retained but which is very easily molded.

The moldable composition of the invention comprises a wax and particles of a foamed polymer, the wax being present in an amount that is capable of bonding the particles together to form a coherent body.

The invention also comprises articles molded from such a composition. The composition itself may be in the form of a wax matrix having the polymer particles embedded therein or discrete polymer particles coated with wax.

The wax can be chosen from a wide range of possibilities but it is obviously desirable for normal uses that it be a solid at ambient temperatures and that the heat content of the wax at molding temperature is not sufficient to cause the particles of expended polymer to contract substantially into a non-useable state. Thus, it is often preferred that the wax have a melting point that is not more than 20° C. above the softening point of the polymer and in many cases it is desirable that the melting point be below the softening point of the polymer.

The amount of wax in the composition is sufficient to bond the particles into a moldable composition and this is frequently at least 20% of the weight of the polymer particles. In practice the weight ratio of wax to polymer particles is from 1:5 to 5:1 such as from 1:2 to 3:1 and particularly from 1:1 to 2:1.

The expanded polymer particles can have any appropriate shape but it is preferred for ease of handling and best surface effect that they be substantially spherical with a diameter of from 0.5 to 15 mm. The particles can be any convenient thermoplastic polymer but are most frequently a polymer of copolymer of a vinyl or vinylidene monomer, preferably a hydrocarbon monomer such as for example, ethylene, propylene, butadiene, styrene, vinyltoluene, or α-methylstyrene, or a substituted monomer such as for example, acrylonitrile, vinyl or vinylidene chloride, vinyl acetate, methyl acrylate, methyl methacrylate or ethyl acrylate. The polymer can for example be aliphatic, particularly a polyolefin such as polyethylene (low density or high density material) or a copolymer of an aliphatic olefin, such as ethylene or propylene with a substituted monomer as mentioned above. Thus, the polymer can for example be a copolymer of ethylene and vinyl acetate. In the most preferred embodiments, however, the particles are formed from a foamed vinylaromatic polymer and especially polystyrene.

The particles can be in the form of substantially spherical beads or optionally can be ground-up scrap foam. For fine uses where the surface finish of the article to be formed from the composition is important it is preferred that beads having a particle size range of from 0.5 to 2.0 mm. and especially from 0.5 to 1.0 mm. are used.

When the surface finish is of particular importance the surface of the molded articles can be brushed with melting wax to cover any roughness where the beads break the surface.

Usually, however, the composition of the invention is of greatest use where size or regularity consideration are of secondary importance.

The density of the expanded polymer particles alone can be anything from 10 to 100 kg/m$^3$ and especially from 15 to 30 kg/m$^3$.

The choice of the wax clearly depends on the material from which the particles are formed. In general, however, especially where the polymer particles are foamed polystyrene particles, waxes having melting points between 30 and 100° C., and preferably 40 and 80° C. are most suitable.

Waxes that often prove very useful include beeswax, candelilla wax, carnauba wax, ceresin wax, Japan wax, Montan wax and paraffin wax. Of these, paraffin wax is often the most convenient in practice. Halognated waxes such as Cerechlor can also be used to import resistance to the spread of flame.

The composition of the invention is very useful for a wide range of applications. It can for instance be used as a straight molding material for reproducing shapes at a very low cost. Because the molding can be done at low temperatures and ambient pressures, low cost equipment such as plaster or papier mache molds can be used. The actual composition is, of course, reusable and this also is a significant cost-saving factor.

Shapes formed from the composition of the invention can also be made by cutting, for example using a hot wire.

Another field in which the composition of the invention is useful is in the production of metal castings in which a pattern molded from the composition of the invention is invested in foundry sand or coated with a hardenable shell as in the lost-wax process. When hot metal is poured onto the pattern, the wax and the polymer particles burn away and the hot metal takes their place.

The composition can also be used to form voids in concrete so as to reduce the amount of concrete used in a structure or to form service channels in a concrete block. This is done by placing the composition of the invention formed into the appropriate shape or as a coating on a preformed void forming member of for example foamed polystyrene of the appropriate shape, in the required position and forming the concrete structure around it. In such cases, it is often desirable to cover the shape in a rigid coating of e.g., hardboard or plywood to give the block added strength. The composition can then be melted by steam, hot water or hot air and the particles collected for reuse.

The invention is further described in the following Examples which also illustrate some of the uses to which the composition of the invention can be put. The Examples are presented as illustrations of the present invention and are not intended in any way to limit the scope or spirit thereof.

EXAMPLE 1

One part of spherical expanded polystyrene particles of 1–1.5 mm. diameter was mixed with 2 parts by weight of paraffin wax of melting point 55°–60° C. The temperature during the mixing process was maintained at 70° C. The semi-fluid mixture which resulted was pressed into a negative mold in the shape of an "M" and when the wax had set the negative mold was removed to yield a positive "M" which could be used for display purposes.

The "M" produced was then invested in foundry sand after first receiving a thin brushed-on coating of wax to cover any small irregularities in the surface. Molten aluminum was poured onto the composition which immediately decomposed and burned away leaving a cast aluminum reproduction of the "M."

EXAMPLE 2

One part of expanded polystyrene granules of diameter 4 to 8 mm. was mixed with one part by weight of the same paraffin wax as used in Example 1.

The semi-fluid mixture was this time trowelled into a light wooden mold in the form of a block. When the wax had set, the now rigid block was anchored by steel strapping with spreader plates to redistribute the load and liquid concrete was poured over and around it and allowed to cure. The block was removed from the concrete by using water at a temperature above the melting point of the wax and the foam particles were collected as they floated out, for subsequent reuse.

EXAMPLE 3

Example 2 was repeated with the light wooden mold lined with hardboard which adhered to the surface of the block when th wax had set affording a composite block which was better able to withstand compressive stresses during the pouring of the concrete. The foam particles were likewise recovered for reuse while the hardboard surface layer remained in place in the concrete.

EXAMPLE 4

A rectangular block of foamed polystyrene was coated with the expanded polystyrene granules/wax composition described in Example 2 to give an overall coating layer that was 50 mm in thickness. The coated block was then used to form a void in a concrete member in the manner described in Example 2. After the concrete had set the wax component of the coating layer was melted enabling the coating layer to be removed. This relieved the pressure on the rectangular block which could then be removed and used again.

What is claimed is:

1. A process for producing a concrete structure having portions defining at least one open void which comprises molding a composition of a wax and particles of foamed polymer (said particles being smaller than said open void), said wax being present in an amount sufficient to bond the particles together, into a coherent molded article in the shape of said open void, placing said molded article in a mold having the required shape for said concrete structure, flowing concrete around said molded article in said mold such that at least a portion of said molded article is a portion of an outer face of said concrete structure, curing said concrete structure and removing said moldable composition from said concrete structure with a hot medium selected from the group consisting of water, steam and air or mixtures thereof, (at a temperature of from about 30 to 100° C., wherein said wax is melted and said foamed particles floated from said open void.

2. A process of claim 1, wherein said molded article is removed by treating said article with water at a temperature above the melting temperature of said wax and recovering said foamed particles in said water.

3. A process of claim 1, wherein the weight ratio of wax to polymer particles is from 1:5 to 5:1.

4. A process of claim 1, wherein the wax has a melting point that is not more than 20° C., above the softening point of the polymer.

5. A process of claim 1, wherein the wax has a melting point below the softening point of the polymer.

6. A process of claim 1, wherein the heat content of the wax at molding temperatures is not sufficient to cause the foamed particles to contract substantially.

7. A process of claim 1, wherein the foamed particles are substantially spherical beads having a size range of from 0.5 to 1.0 mm.

8. A process of claim 1, wherein the density of the foamed particles is from 15 to 30 kgm/cubic meter.

9. A process of claim 1, wherein the polymer is a vinylaromatic polymer.

10. A process of claim 1, wherein the polymer is polystyrene.

11. A process of claim 1, wherein the wax is paraffin wax.

* * * * *